United States Patent
Wise

(10) Patent No.: US 6,886,836 B1
(45) Date of Patent: May 3, 2005

(54) COUNTERBALANCED UNIVERSAL MOBILE SAW STAND

(76) Inventor: Robert W. Wise, 365 Ely Rd., Petaluma, CA (US) 94954

( * ) Notice: Subject to any disclaimer, the term of this patent is extended or adjusted under 35 U.S.C. 154(b) by 12 days.

(21) Appl. No.: 10/313,981

(22) Filed: Dec. 5, 2002

(51) Int. Cl.⁷ ............................................. B62B 1/02
(52) U.S. Cl. ................ 280/30; 280/47.24; 280/47.27; 280/47.28
(58) Field of Search .................. 280/47.24, 47.25, 280/47.27, 47.28, 47.33, 30, 47.19, 639, 280/38, 641, 651, 652

(56) References Cited

U.S. PATENT DOCUMENTS

| | | | | |
|---|---|---|---|---|
| 1,601,250 A | * | 9/1926 | Hilderbrand ................. 280/30 |
| 2,544,220 A | * | 3/1951 | Concklin ..................... 280/641 |
| 2,784,004 A | * | 3/1957 | Hamrick, Jr. ................ 280/30 |
| 3,147,748 A | * | 9/1964 | Frank ........................ 126/9 R |
| 3,669,031 A | * | 6/1972 | Cole ........................... 108/102 |
| 4,230,329 A | * | 10/1980 | Johnson ................... 280/43.17 |
| 4,284,286 A | * | 8/1981 | Lewallen ..................... 280/30 |
| 4,565,382 A | * | 1/1986 | Sherman .................. 280/47.18 |
| 4,934,718 A | * | 6/1990 | Voegele ........................ 280/30 |
| 5,154,441 A | * | 10/1992 | White et al. ................ 280/645 |
| 5,536,034 A | * | 7/1996 | Miller ......................... 280/651 |
| 5,863,052 A | * | 1/1999 | Roman ......................... 280/30 |
| 5,957,472 A | * | 9/1999 | Borgatti ....................... 280/30 |
| 6,328,319 B1 | * | 12/2001 | Stahler, Sr. .............. 280/47.18 |
| 6,345,829 B1 | * | 2/2002 | Mueller ................... 280/47.18 |
| 6,364,328 B1 | * | 4/2002 | Stahler, Sr. .............. 280/47.18 |
| 6,530,583 B1 | * | 3/2003 | Mueller ................... 280/47.18 |
| 6,578,856 B2 | * | 6/2003 | Kahle .......................... 280/30 |
| 2002/0125662 A1 | * | 9/2002 | Magness ...................... 280/30 |

\* cited by examiner

*Primary Examiner*—Christopher P. Ellis
*Assistant Examiner*—J. Allen Shriver
(74) *Attorney, Agent, or Firm*—Black Lowe & Graham PLLC

(57) ABSTRACT

This saw stand is a mobile unit, via a built-in hand truck design which enables the end user to transport common table saws and equipment to the location of the project being undertaken. The unit quickly folds out into a fully supporting work bench for actual use of the saw and/or equipment.

3 Claims, 5 Drawing Sheets

COUNTERBALANCED UNIVERSAL MOBILE SAW STAND

CROSS-REFERENCE TO RELATED APPLICATION

This application is related to and hereby incorporates the disclosure of non-provisional patent application Ser. No. 09/795,032 entitled "Universal Mobile Saw Stand", filed Feb. 26, 2001.

TECHNICAL FIELD

The invention relates to mobile stands for tools. More specifically, the invention relates to mobile stands for power tools.

BACKGROUND OF THE INVENTION

Portable, wheeled tool carts have been available for some time. Once such prior art tool cart is shown and described by Wise, the inventor herein, in U.S. Pat. No. 5,642,898 issued Jul. 1, 1997. Additional tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw table apparatus. U.S. Pat. No. 5,255,724; issued Oct. 26, 1993, to Butke, describes an adjustable extension assembly. A brochure showing the Rousseau SS2850 product discloses a mobile miter saw stand.

Nevertheless, a need exists for a mobile saw stand which enables an end user to transport common table saws and the like to the location of the project being undertaken wherein the mobile saw stand quickly folds out into a fully supporting work bench for actual use of the saw and or equipment.

A further need exists for a mobile stand unit which enables the unit to stand in a vertical position with the saw attached and also the ability to use the saw when attached to the mobile saw stand unit in a horizontal stored position for hardwood floor installers and the like.

Finally, a need exists for a mobile saw stand unit which facilitates raising and lowering the stand unit with a portable miter saw or the like attached to a bed of the stand unit.

BRIEF SUMMARY OF THE INVENTION

It is therefore an object of the present invention to provide a mobile saw stand unit which enables an end user to transport common table saws and the like to the location of the project being undertaken wherein the mobile saw stand quickly folds out into a fully supporting work bench for actual use of the saw and or equipment.

It is a further object of the invention to achieve the above object in a mobile saw stand unit which enables the unit to stand in a vertical position with the saw attached.

It is yet another object of the invention to achieve the above objects in a mobile saw stand unit which has the feature of a user being able to use the saw when attached to the mobile saw stand unit in a horizontal stored position for hardwood floor installers and the like.

It is a final object of the invention to provide a counterbalance to facilitate raising and collapsing the saw stand with a saw unit in place.

The invention achieves the above objects and other objects and advantages which will become apparent from the description which follows by providing a universal mobile saw stand.

In its preferred embodiment, this saw stand is a mobile unit, via a built-in hand truck design which enables the end user to transport common table saws and equipment to the location of the project being undertaken. The unit quickly folds out into a fully supporting work bench for actual use of the saw and/or equipment.

In its preferred embodiment, this saw stand has a built-in feature which enables the unit to stand in the vertical position with the saw attached. This creates ease in transporting the unit to and from the workplace, i.e., in elevators, truck beds, etc. Also built into the design is the ability to use the saw in the horizontal stored position for hardwood floor installers, etc.

In its preferred embodiment, this unit is constructed of powder coated tubular steel and sheet metal. Ergonomic handles and lockout devices are incorporated into each aspect of this unit for ease of use, safety and product longevity. Quick automatic latch mechanisms are an integral part of the unit for the flip out support leg and the saw table surface. These latches are automatic in the set up mode and require manual release for returning the unit to the stored position.

In an alternate embodiment of the invention, a spring-loaded, telescoping shock absorber is pivotally connected between a bed of the unit and legs of the unit to counterbalance an attached saw.

DETAILED DESCRIPTION OF THE PREFERRED EMBODIMENTS

Figure 1:
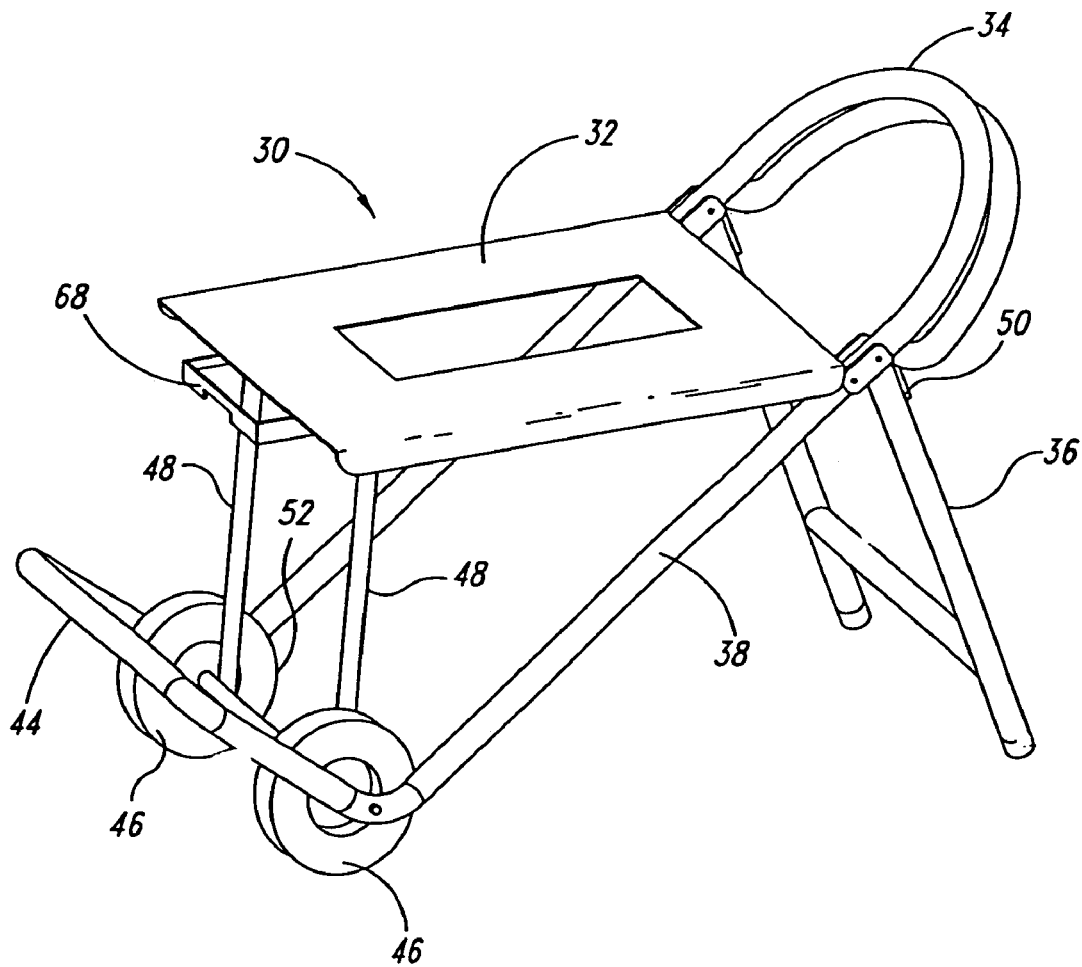
FIG. 1 is an isometric, environmental view of the mobile saw stand in an extended, raised position.
Figure 2:
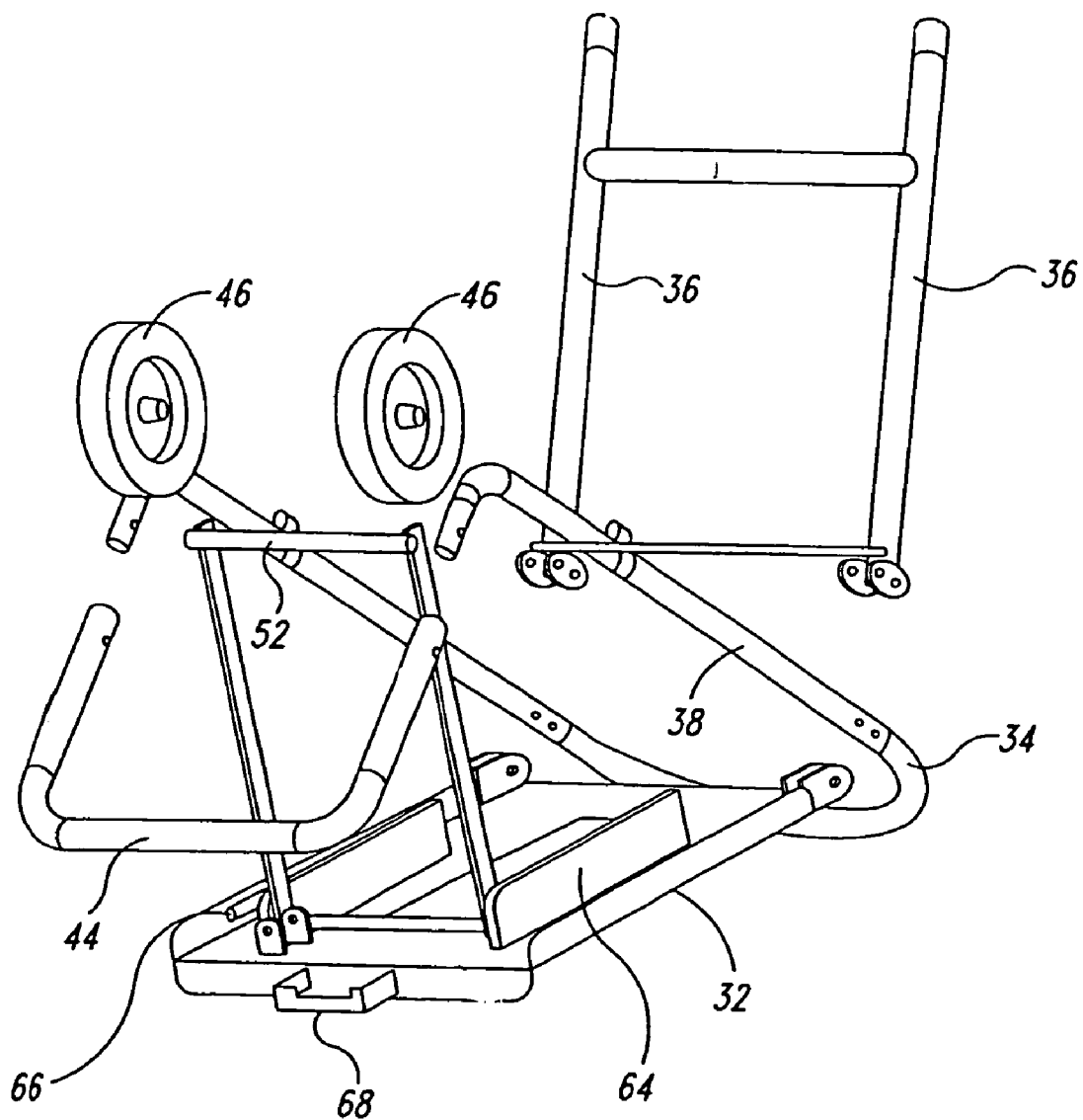
FIG. 2 is a front, exploded assembly diagram of the invention in an inverted position.
Figure 3:
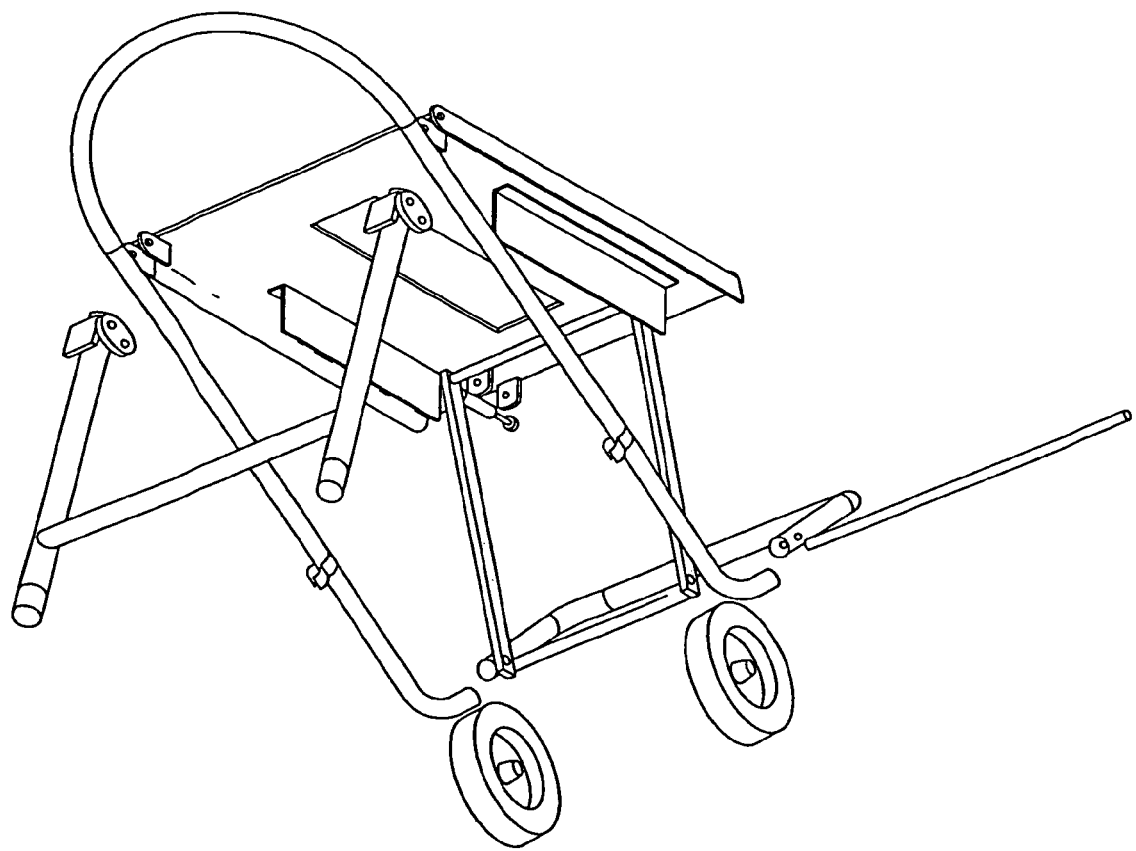
FIG. 3 is a rear, exploded assembly diagram of the invention in an inverted position.

This saw stand shown in FIGS. 1 through 6 is a mobile unit, via a built-in hand truck design which enables the end user to transport common table saws and equipment to the location of the project being undertaken. The unit quickly folds out into a fully supporting work bench for actual use of the saw and/or equipment.

This saw stand has a built-in feature which enables the unit to stand in the vertical position with the saw attached. This creates ease in transporting the unit to and from the workplace, i.e., in elevators, truck beds, etc. Also built into the design is the ability to use the saw in the horizontal stored position for hardwood floor installers, etc.

This unit is constructed of powder coated tubular steel and sheet metal. Ergonomic handles and lockout devices are incorporated into each aspect of this unit for ease of use, safety and product longevity. Quick automatic latch mechanisms are an integral part of the unit for the flip out support leg and the saw table surface. These latches are automatic in the set up mode and require manual release for returning the unit to the stored position.

The preferred embodiment 30 of the mobile saw stand invention includes a substantially hand-truck shaped main frame 38 having a handle portion 34 and a distal bottom end portion 44 including a pair of wheels 46 rotatably connected to the bottom end portion for transporting the stand 30. A pair of swing out legs 36 pivotally connect the main frame 38 by spring-loaded, locking button type hinges 50 adjacent to the handle portion 34. The legs 36 are movable between a stowed position and a raised position with respect to the main frame 38. A bed 32 is pivotally connected to the main frame 38 adjacent to the handle portion for removably receiving a table saw (not shown). The bed 32 is movable between a stowed position and a raised position with respect to the main frame by way of the hinges 50. A movable bed support 48 is provided for selectively supporting the bed in a raised position and in a stowed position with respect to the main frame. The bed support 48 has one end pivotally connected to the main frame 38 by an axle 52 which supports the wheels. A distal end of the bed support is slidably connected to the bed by way of rails 64, whereby the table saw is usable on the bed in either the raised or stowed position. The bed 32 is preferably provided with a handle 68.

The mobile saw stand 30 includes an automatic locking mechanisms 66, 50 to secure the bed 32, the swing out legs 36, and the bed support 48 in their respective raised positions with respect to the main frame 38.

The wheels 46 are rotatably connected to the bottom end portion 40 of the frame 38 by the elongated axle 52. One end of the movable bed support 48 is pivotally connected to the main frame by being rotatably connected about the axle as well.

Figure 4:
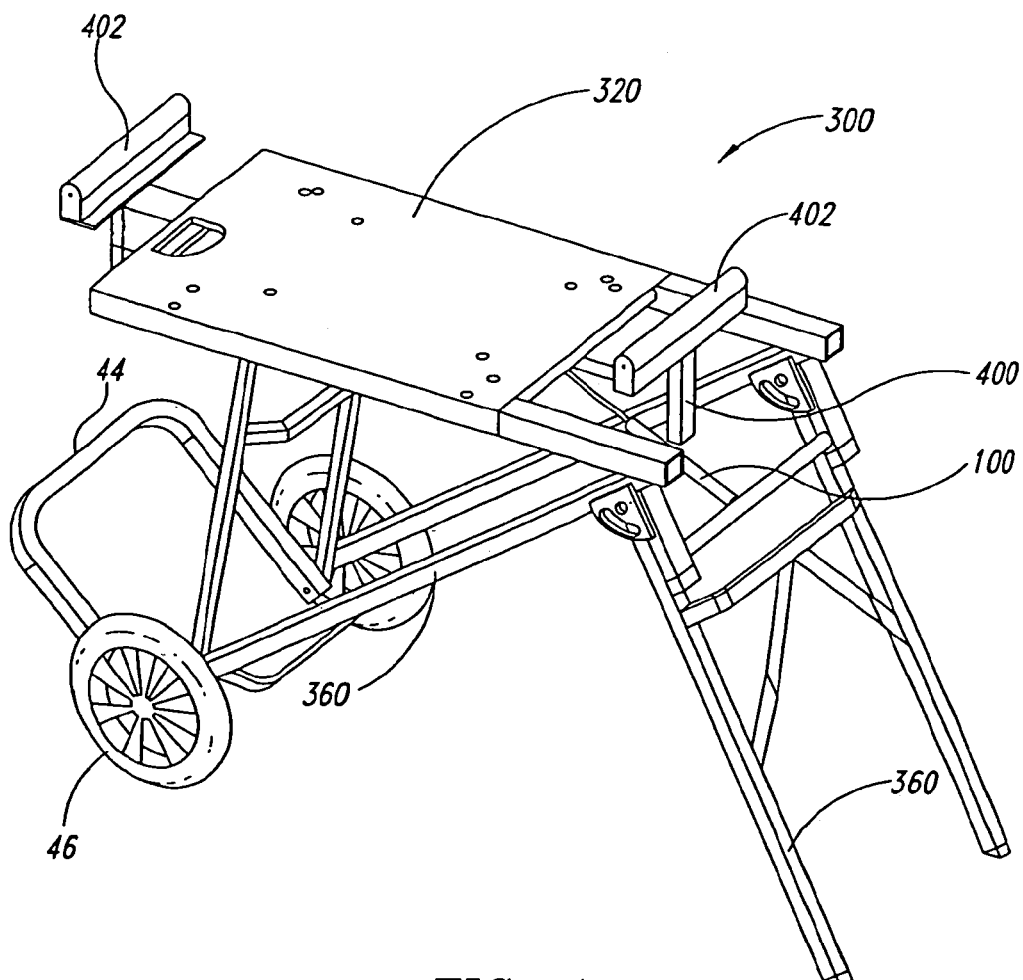
FIG. 4 is a perspective environmental view of an underside of an alternate embodiment of the present invention including a pre-loaded, telescopic shock absorber device pivotally interconnected between the bed and legs of the mobile saw stand.
Figure 5:
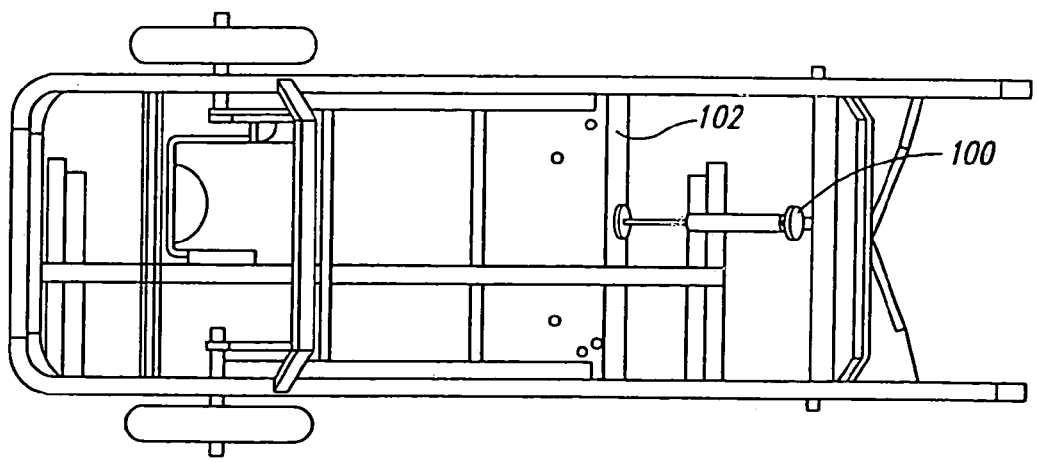
FIG. 5 is a bottom plan view of the alternate embodiment.
Figure 6:
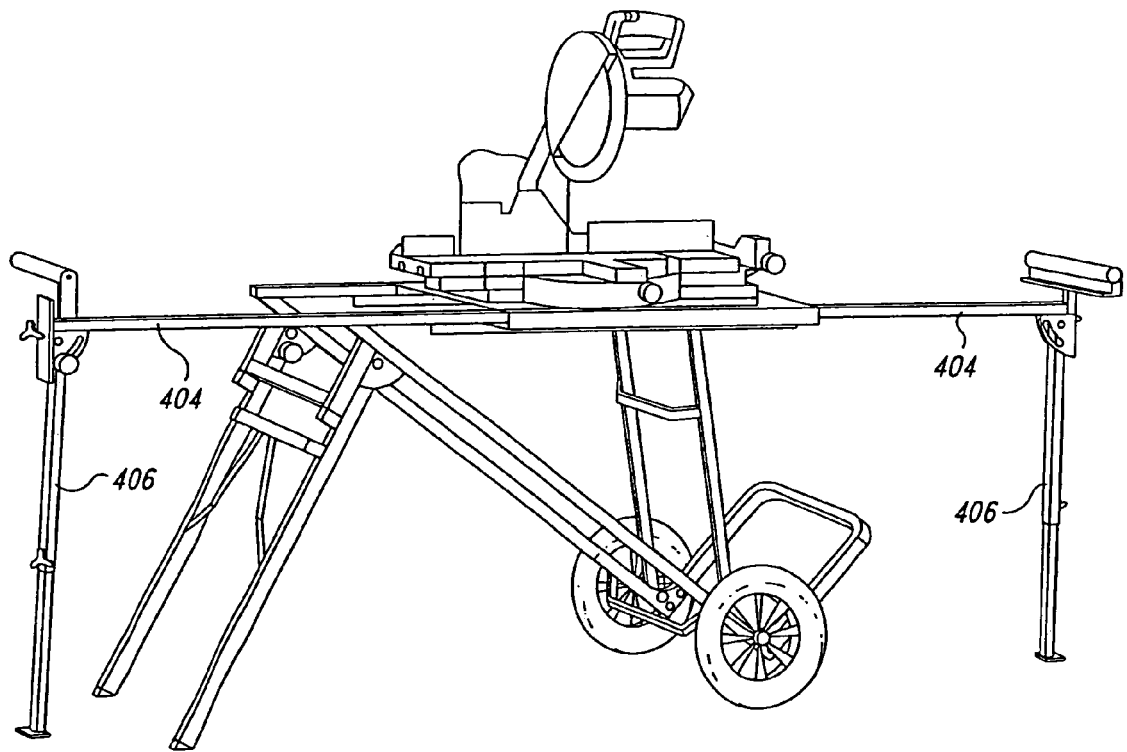
FIG. 6 is a perspective environmental view of the alternate embodiment showing table extensions in an extended position.

FIGS. 4, 5 and 6 illustrate an alternate embodiment 300 of the invention in which a spring-loaded, telescopic device 100 having one end pivotally connected to a cross bar 102 which interconnects the swing out legs 360, and having a distal end pivotally connected to the saw bed 320. The telescopic device is of the conventional type as used in automobile hatch backs and the like. The device 100 is preferably pre-loaded to about 25 lbs. when in the compressed position to assist in setting up and collapsing the unit 300 when a table saw, chop saw, miter saw or the like (not shown) is received on the bed. The alternate embodiment also preferably includes conventional table saw extensions 400 having conventional rollers 402 thereon. The extensions are telescopically extensible as shown in FIG. 6 by means of tubes 404 and swing out, telescopic, adjustable supports 406.

Those of ordinary skill in the art will conceive of other alternate embodiments of the invention upon reviewing this disclosure. Thus, the invention is not to be limited to the above description, but is to be determined in scope by the claims which follow.

I claim:

1. A mobile saw stand, comprising:
   a substantially hand-truck shaped main frame having a handle portion and a distal bottom end portion including a pair of wheels rotatably connected to the bottom end portion for transporting the stand;
   a pair of swing out legs pivotally connected to the main frame adjacent to the handle portion, the legs being movable between a stowed position and a raised position with respect to the main frame;
   a bed pivotally connected to the main frame adjacent to the handle portion for removably receiving a table saw, the bed being movable between a stowed position and a raised position with respect to the main frame, the bed further having a continuous rails on an underside thereof;
   a movable bed support for selectively supporting the bed in a raised position and in a stowed position with respect to the main frame, wherein the bed support has one end pivotally connected to the main frame and a distal end slidably connected to the continuous rails on the bed, whereby the distal end of the bed support is continuously engaged with the bed and the table saw is usable on the bed in either the raised or stowed position; and
   bias means for biasing the bed to the raised position to facilitate raising and stowing the bed with a saw mounted thereon.

2. The mobile saw stand of claim 1 wherein the bias means is a telescopic device having a first end pivotally connected to the pair of swing out legs and a distal end pivotally connected to the bed.

3. The mobile saw stand of claim 2 wherein the wheels are rotatably connected to the bottom end portion by an elongated axle and wherein the one end of the movable bed support is pivotally connected to the main frame by being rotatably connected about the axle.

* * * * *